No. 818,706. PATENTED APR. 24, 1906.
F. O'NEILL.
JAR CLOSURE.
APPLICATION FILED JUNE 10, 1905.

WITNESSES
Geo. N. Green
Jas. P. Barry

INVENTOR
FRANK O'NEILL

BY James Whittemore
ATT'Y.

UNITED STATES PATENT OFFICE.

FRANK O'NEILL, OF DETROIT, MICHIGAN.

JAR-CLOSURE.

No. 818,706.

Specification of Letters Patent.

Patented April 24, 1906.

Application filed June 10, 1905. Serial No. 264,684.

*To all whom it may concern:*

Be it known that I, FRANK O'NEILL, a citizen of the United States, residing at Detroit, in the county of Wayne and State of Michigan, have invented certain new and useful Improvements in Jar-Closures, of which the following is a specification, reference being had therein to the accompanying drawings.

The invention relates to jar-closures; and it consists in the novel construction, as hereinafter set forth.

Figure 1:
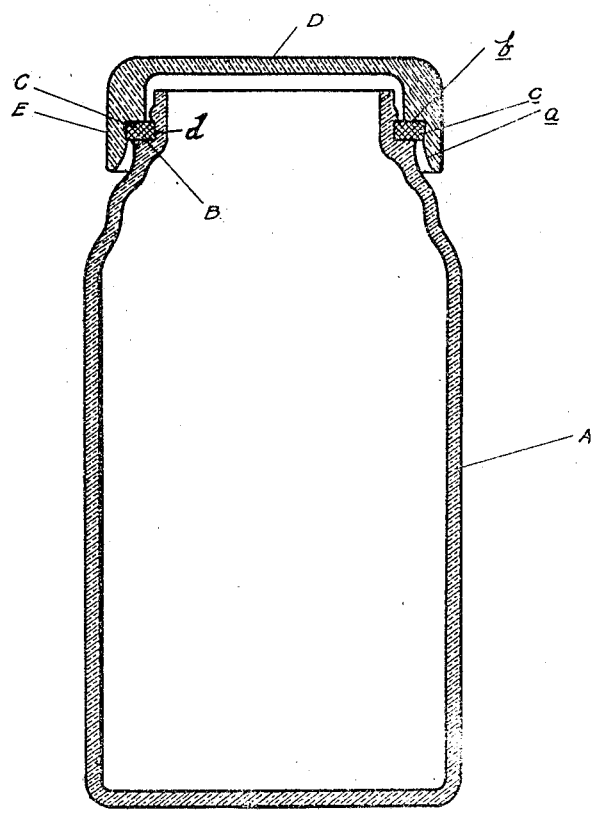
Figure 2:
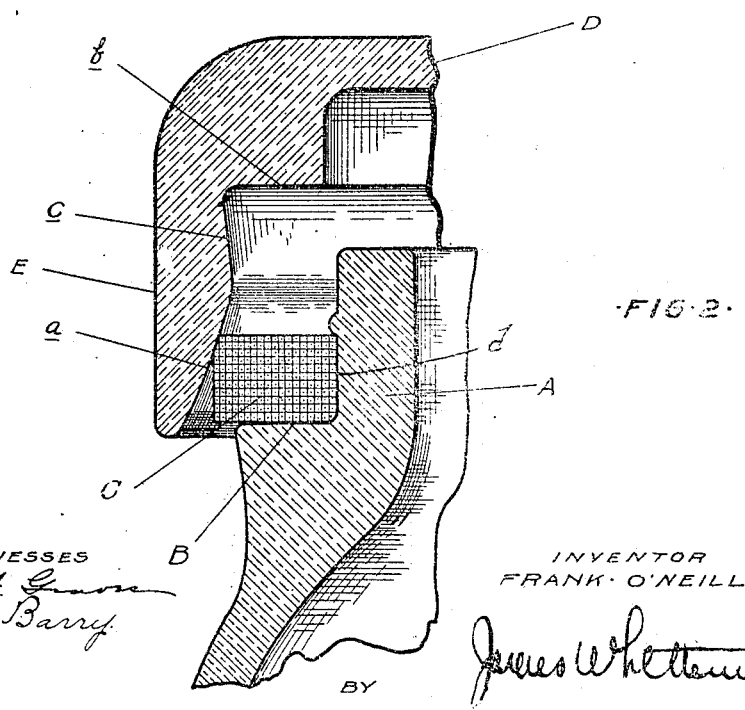

In Figure 1 of the drawings the jar is represented in vertical longitudinal section, and Fig. 2 is an enlarged view of the joint.

It is usual in the constructoin of jar-closures to seal the joint by an elastic packing or gasket, which is arranged between parallel faces upon the jar and cover, respectively, the parts being held together by a screw-cap or other clamping means. Closures have also been formed in which a gasket of rounded cross-section is arranged to be peripherally compressed between the cover and jar. The objection to the first form is that the joint is dependent entirely upon the clamping means, while the second construction requires a special form of gasket, which is more expensive to manufacture than those commonly in use.

It is the object of the present invention to provide a closure in which the common form of gasket—that is, one which is rectangular in cross-section—is employed and in which the sealing is effected by a peripheral compression of this gasket. This permits of dispensing with the clamping means, it being only necessary to press the cover upon the jar to effect the closing.

As shown, a jar A, which may be of any suitable construction, is provided at its top with a shoulder B in a substantially horizontal plane, which forms a seat for the gasket C.

D is the jar-cover, provided with a peripheral flange E, which has a flaring portion $a$ at its lower end and above this a shoulder $b$, which is opposed to the shoulder B on the jar. Between this shoulder $b$ and the flaring portion $a$ is a portion $c$, which is inclined oppositely to the angle of the flaring portion $a$.

With this construction the gasket C, which is a ring having parallel top and bottom and inner and outer faces, is placed upon the jar so as to rest upon the shoulder B, and above this the jar is preferably slightly recessed at $d$ to receive the inner faces of the gasket and prevent its accidental disengagement from the jar. To close the jar, it is only necessary to press the cover downward, whereupon the inclined face $a$ of the flange will peripherally press the gasket until it is forced into engagement with the oppositely-angling portion of the flange $c$. By reason of this opposite angle the resiliency of the compressed gasket will tend to force the cover downward instead of forcing it upward. Thus the joint is sealed not only between the peripheral contacting points, but also between the upper and lower faces of the gasket and the corresponding faces B and $b$ on the jar and cover. Furthermore, the atmospheric pressure acting by reason of the partial vacuum in the jar will tend to hold the cover in position and seal the joint between the lower and upper faces of the gasket. Thus all four faces of the gasket are effective in sealing the jar.

What I claim as my invention is—

1. The combination with a jar and cover having oppositely-arranged parallel faces, of a gasket having its upper and lower faces respectively contacting said faces on the jar and cover, and a flaring flange on said cover for peripherally compressing said gasket.

2. A jar and cover respectively provided with external and internal opposed faces, an annular gasket having parallel external and internal surfaces sleeved upon said external face of the jar and of greater width than the space between said face and the opposed face on the cover, a flaring flange upon said cover for peripherally compressing said gasket, and a shoulder on said jar for holding said gasket from longitudinal movement during the peripheral compression.

3. A jar and cover having opposed external and internal surfaces and opposed adjacent shoulders, an annular gasket having a substantially rectangular cross-section sleeved upon said external surface of the jar and resting upon the adjacent shoulder, said gasket being of greater width than the space between said jar and the opposed surface of the cover, and a flaring flange on said cover extending from said internal face, forming a means of peripherally compressing said gasket.

4. A jar and a cover respectively provided with external and internal opposed faces and adjacent opposed shoulders, said internal face on the cover being inclined to contract downwardly, a gasket sleeved upon said jar and resting upon the adjacent shoulder, and a flaring downwardly-projecting flange on said cover oppositely angled to said internal face, whereby in the depression of said cover upon said jar, said flange will peripherally
5 compress said gasket and the incline of said internal surface will provide a slight expansion which will retain the cover to the jar.

In testimony whereof I affix my signature in presence of two witnesses.

FRANK O'NEILL.

Witnesses:
　JAMES P. BARRY,
　EDWARD D. AULT.